United States Patent [19]

Fuchs

[11] Patent Number: 4,570,124

[45] Date of Patent: Feb. 11, 1986

[54] IGNITION SYSTEM TEST/DIAGNOSTIC INSTRUMENT

[76] Inventor: Richard W. Fuchs, 17 Deerfield La., Simsbury, Conn. 06070

[21] Appl. No.: 577,675

[22] Filed: Feb. 7, 1984

[51] Int. Cl.[4] .......... G01M 15/00

[52] U.S. Cl. .......... 324/401; 73/118

[58] Field of Search .......... 73/118; 324/401; 417/460, 467, 468, 469

[56] References Cited

U.S. PATENT DOCUMENTS 1,743,881 1/1930 Cole .......... 324/401

FOREIGN PATENT DOCUMENTS 2104159 3/1983 United Kingdom .......... 417/460

*Primary Examiner*—Jerry W. Myracle

*Attorney, Agent, or Firm*—Prutzman, Kalb, Chilton & Alix

[57] ABSTRACT

A portable self-contained ignition system test diagnostic instrument for testing single cylinder and multi-cylinder spark ignited engines is disclosed comprising a housing having an interior spark chamber, a transparent portion permitting visual observation of the spark chamber, an outer portion performing an exterior air pump chamber, and an air passageway connecting the outer portion and the spark chamber, a reciprocal air pump movably mounted about the outer portion of the housing to form an air pump chamber therebetween for pumping compressed air through the air passageway to pressurize the spark chamber upon reciprocation of the pump, a check valve connected to the air passageway, a spark plug having a pair of electrodes forming a spark gap of predetermined size and mounted to the housing so that the spark gap is positioned within the spark chamber and visible through the transparent housing, a ground wire for detachably grounding the spark plug to an engine ground point, and a pressure gauge for indicating pressure within the spark chamber.

10 Claims, 3 Drawing Figures

IGNITION SYSTEM TEST/DIAGNOSTIC INSTRUMENT

BACKGROUND AND SUMMARY OF THE INVENTION

This invention relates to an internal combustion engine test instrument and more particularly to a portable self-contained ignition system diagnostic instrument for testing single cylinder and multi-cylinder spark ignited engines.

In a gasoline engine ignition system, certain visible operating characteristics of the spark arc across the electrodes of the spark plug are indicative of the well being of the ignition system. Particularly, abnormal color, low intensity, or nonuniform firing frequency of the spark arc are indicative of unacceptable system performance.

Therefore, in diagnosing and troubleshooting an ignition system, it is desirable to test the ignition system from the position of the spark plug by observing the visual characteristics of the spark arc. Moreover, it is desirable to perform the testing under simulated operating conditions wherein the ignition system is functioning under a selectively variable "load", i.e., the spark arc being subject to varying amounts of compressed air.

It is also desirable that such a test/diagnostic instrument be portable, self-contained, and easy to use without the need for specialized equipment. Additionally, it is desirable that such a test instrument be economical and cost efficient to manufacture.

In accordance with the present invention, a portable, self-contained ignition system diagnostic/test instrument is disclosed which includes a housing having an interior spark chamber, a transparent portion permitting visual observation of the spark chamber, an outer portion for forming an exterior air pump chamber, and an air passageway connecting the outer portion and the chamber. A reciprocal transparent air pump sleeve assembly is moveably mounted about the outer portion of the housing in sealing engagement therewith with the pump sleeve assembly and outer portion of the housing forming an air pump chamber therebetween and coacting to pump air through the air passageway to pressurize the spark chamber upon reciprocation of the pump sleeve assembly. A check valve is operationally connected to the air passageway for maintaining air pressure with the spark chamber. A spark plug having a pair of electrodes forming a spark gap of predetermined size is mounted to the housing chamber in sealing engagement therewith so that the spark gap is positioned within the spark chamber and visible through the transparent portion. A ground wire for detachably grounding the spark plug to an engine ground is connected to the spark plug. A pressure gauge is operationally connected to the spark chamber for indicating pressure within the spark chamber.

Accordingly, it is an object of the present invention to provide a new and improved portable ignition system test/diagnostic instrument for testing both single cylinder and multi-cylinder gasoline engines.

Another object of the invention is to provide a test instrument that includes a self-contained means for varying "load", pressure, for testing an ignition system under variable "load" conditions, simulating compression in actual operation.

A still further object of the invention is to provide an ignition system test instrument that is easily operable without specialized equipment.

A further object of the invention is to provide a portable ignition system test instrument that is economical and cost efficient to manufacture.

Other objects will be in part obvious and in part pointed out more in detail hereinafter.

DESCRIPTION OF THE PREFERRED EMBODIMENT

Figure 1:
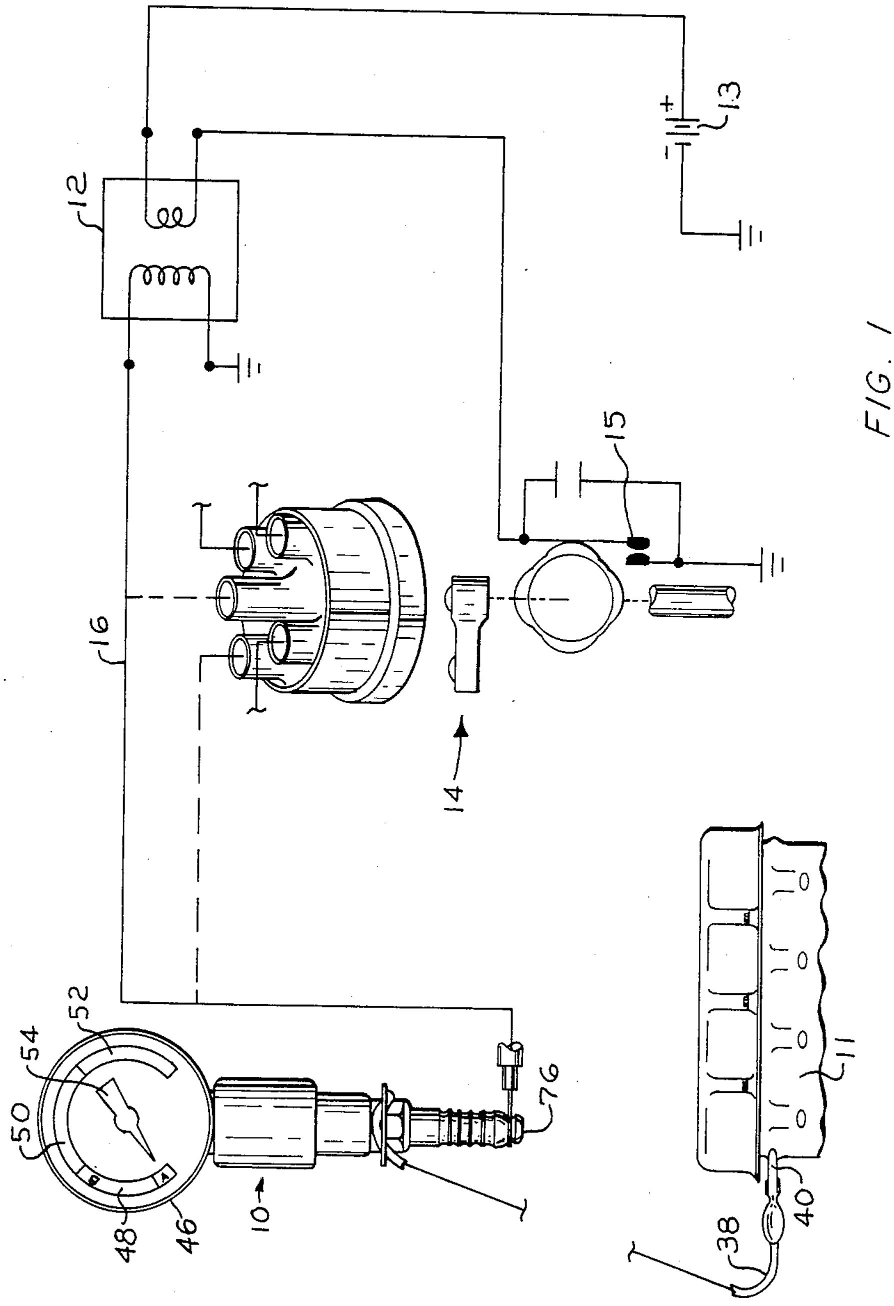
FIG. 1 is partly diagrammatic view showning the ignition system test instrument of the present invention connected for testing the ignition system of a four cylinder engine.

The portable ignition system test instrument of this invention is generally diesignated by the numeral 10 and is shown in FIG. 1 operationally connected to the conventional ignition system of a four cylinder internal combustion engine 11 which comprises an ignition coil 12, a battery 13, and a rotor assembly 14 with breaker points 15 electically connected in a conventional manner. The ignition system test instrument can also be used with solid state breakerless systems.

As will be explained, the test instrument 10 will allow visual observation of the spark arc under selectable incremental pressure since it has been found that an ignition system may appear to function properly under no pressure or low pressure, but may actually function improperly at higher pressures. For example, the ignition system may function so as to fire the spark plug at 0 p.s.i., but may not adequately operate under load or high speed, or may be hard starting. While a malfunctioning system may fire at 0 p.s.i., the spark arc will deteriorate or disappear as the pressure or ignition "load" is increased. Accordingly, the present invention tests the ignition system under increasing pressures looking into the system from the position of the spark plug(s) to effectively test the ignition wire(s), coil(s), and distributor or magneto.

Figure 2:
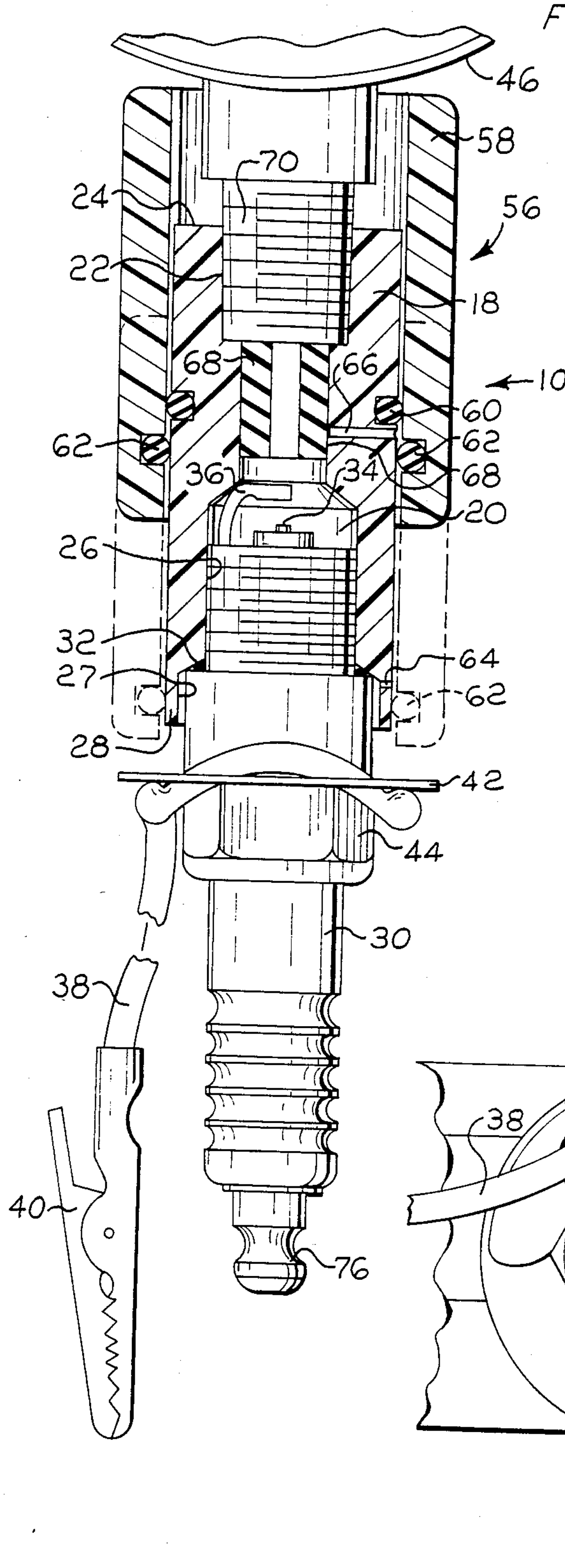
FIG. 2 is an enlarged, partly sectional, side view of the ignition system test instrument of FIG. 1.

Referring to FIG. 2, the test instrument 10 comprises an elongated housing 18 made of clear transparent plastic such as acrylic and having a stepped axial bore forming an interior spark chamber 20 visible through the transparent housing 18. A threaded axial bore 26 and an enlarged counter bore 27 are provided at one axial end 28 of the housing 18. A conventional spark plug 30 is threadably mounted within the threaded bore 26 with an O-ring 32 in sealing engagement with the housing 18 so that its spark plug electrodes 34, 36 are positioned within ignition chamber 20. The electrodes 34, 36 form a gap therebetween which is readily visible through transparent housing 18. For low pressure testing up to 30 p.s.i., a preferred electrode gap is 0.060 inches. For testing up to 60 p.s.i., an electrode gap of 0.040 inches is preferable. For specialized testing this gap may be otherwise.

Figure 3:
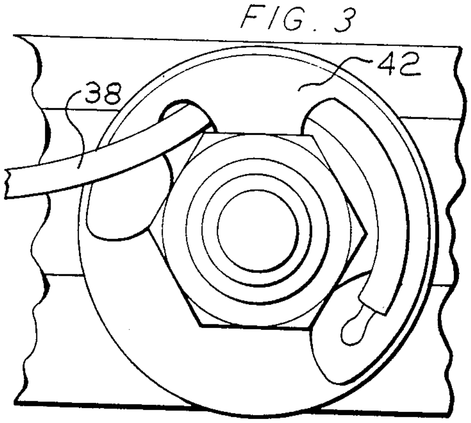
FIG. 3 is an end view of the test instrument of FIG. 2.

In order to ground spark plug 30 to the engine to be tested, a ground wire 38 having a suitable test or alligator clip 40 at its free end is connected by welding or the like to a metal "C" type retaining clip 42 to provide a strong mechanical and electrical connection therebetween. The "C" clip is clamped to the metal body 44 of spark plug 32 to electrically connect the ground wire 38 to the spark plug 30. As seen in FIG. 3, the ground wire 38 is interwoven between the three fingers of the retaining clip 42 to provide a strain relief. The ground wire 38 is of sufficient length and flexibility to allow the user to connect the test clip 42 to the engine for grounding purposes.

At the other end 24 of the housing 18, a pressure gauge 46 is mounted within a threaded axial bore 22 (at the other axial end 28 of the housing 18 from the spark plug 32) for indicating pressure within the spark chamber 20. The pressure gauge 46 is incrementally color coded having a red band 48, a yellow band 50, and a green band 52 disposed about an indicator needle 54. Each band represents an incremental pressure range which is preferably 0–10, 10–20, and 20–30 p.s.i. respectively in the illustrated embodiment.

A reciprocal sleeve air pump assembly generally designated by the numeral 56 is slidably mounted about the outer portion of the housing 18 and functions to pressurize spark chamber 20 to the desired pressure. The pump assembly 56 generally comprises a cylindrical sleeve 58 and O ring 62 slidably mounted about the outer cylindrical surface of the housing 18 and preferably made of clear transparent plastic. The diametral clearance between the housing 18 and the sleeve 58 forms an air pump chamber therebetween. In the illustrated embodiment, the diametral clearance is approximately 0.010 to 0.020 inches.

The air pump chamber is sealed at one end by an annular seal or O-ring 60 mounted within a peripheral annular groove in the outer diameter of the housing 18 in sealing engagement with the inner cylindrical surface of the sleeve 58. At the other end of the pump chamber, an annular seal or O-ring 62 is mounted within an annular groove in the interior diameter of the sleeve 58 in sealing engagement with the outer portion of the housing 18. Accordingly, the pump chamber is continuously sealed by the O-rings 60, 62 as the sleeve 58 reciprocates along the housing 18.

Referring to FIG. 2, the sleeve 58 is slidably mounted about the housing 18 for movement between an extended position (as shown in broken line) and a compression position (as shown in full line). The retainer clip 42 and ground wire 38 are positioned relative to the housing 18 so as to form a stop for the manually operated sleeve in the extended position and the body of the pressure gauge 46 is positioned to form a stop for the sleeve 58 in the compression position. Pressure gage 46 also acts as an adjustment, during manufacture, so the proper minimum clearance can be maintained between O rings 60, 62 when the sleeve 58 is in the compression position.

An air supply port 64 provides inlet air to the pump chamber for compression when the sleeve 58 is in the extended position shown in broken lines in FIG. 2. The air passageway is formed by port 64 and the diametral clearance between the spark plug and the interior wall surface forming the counter bore 27. The port 64 extends radially outwardly through the housing 18 from the counter bore 27 to the pump chamber. Thus, an air passageway to atmosphere is formed by the port 64 and the diametral clearance between the spark plug 30 and housing 18.

The port 64 is positioned relative to the movement of the sleeve 58 such that the O-ring 62 sealingly engages the housing 18 at a point outward of the port 64 when the sleeve 58 is in the extended position. In this manner, the air pump chamber is connected to atmosphere via port 64 when the sleeve 58 is in the extended position. However, the initial movement of the sleeve 58 from the extended position toward the compression position moves the O-ring 62 inwardly of the port 64 to thereby disconnect or close off the atmospheric air supply port from the pump chamber. The air trapped in the pump chamber is then compressed during the compression stroke of the sleeve 58 as the sleeve 58 is moved towards the compression position through the reduction of the displacement of the pumping chamber.

Referring to FIG. 2, an air passageway 66 extends through housing 18 interconnecting spark chamber 20 and the pump chamber formed between the housing 18 and the sleeve 58. During reciprocation of the sleeve 58, compressed air is forced from the air pump chamber through the air passageway 66 into spark chamber 20. A check valve 68 is provided to prevent the compressed air forced into the chamber 20 from being withdrawn therefrom when the sleeve is moved from the compression position to the extended position. The check valve thus maintains air pressure within the spark chamber 20.

The check valve 68 consists of a cylindrical seal which is displaced from the passageway 66 by the compressed air flowing therethrough to the spark chamber 20 and otherwise sealingly engages the internal wall of the ignition chamber 20 to seal off the air passageway 66. The internal wall of the spark chamber 20 is cylindrically shaped in the vicinity of the air passageway 66 and the cylindrical seal 68 is accordingly dimensioned and configured for yieldable displacement by the compressed air flow through the passageway 66 and for sealing engagement with the interior wall to seal off the passageway 66 upon cessation of the compressed air flow therethrough.

The radial thickness of the cylindrical seal 68 is predetermined to displace unwanted extraneous volume of the spark chamber 20 so that fewer reciprocating strokes of the sleeve 58 are required to pressurize the spark chamber 20. In assembly, the cylindrical seal 68 is maintained in position by abutment with the connector stem 70 of the pressure gauge 46. Other acceptable check valve configurations may be utilized.

Accordingly, the pressure within the spark chamber 20 is increased by manual reciprocation of the sleeve 58 until a predetermined pressure is indicated by the pressure gauge 46. In this manner, an ignition system may be tested under a selectively variable "load" as described in more detail hereinafter. In order to release the pressure within the spark chamber 20 after testing or in order to revert to a lower pressure range, the spark plug 30 with its O-ring seal 32 are "backed off" from the inlet bore 26 to unseat the O-ring seal 32 from the housing 18 thereby allowing the pressure in spark chamber 20 to escape to atmosphere. A bleed valve or other means may alternately be utilized to selectively relieve the pressure within the spark chamber 20.

In testing an ignition system, the color, intensity, and firing frequency of the spark arc are indicative of the operation of the ignition system. A properly operating ignition system will produce a spark arc that is bluish in color (not red or orange). The spark arc can be composed of many spark arc "lines" to achieve the proper spark intensity rather than one or two thin arc lines. Firing should occur at a regular frequency rather than sporadically. Also, deterioration of the spark arc as the pressure is incrementally increased is indicative of an electrical or mechanical malfunction in the ignition system.

To test a single cylinder engine, the ground wire 38 is connected by the test clip 40 to any suitable ground point on the engine. The spark plug wire is removed from the engine spark plug and mounted on the upper terminal 76 of the test spark plug 32. The spark plug is removed from the engine. At 0 p.s.i., ('A' position on the gauge) the engine is cranked with a rope or electric starter, as the case may be, at a reasonable speed, i.e., neither unduly slow nor excessively high. The ignition spark arc is visually observed through the transparent housing 18 and sleeve 58 for proper color, intensity, and firing frequency. For example, if the spark arc is red or orange or is nonexistent, the ignition system is malfunctioning.

If the spark arc exhibits the proper color, intensity, and firing frequency, the sleeve 58 is reciprocated until the indicator needle 54 is positioned at 'B' within the red band 48 to indicate a chamber pressure of approx. 7-9 p.s.i. With the pressure increased, the engine is again cranked over and the spark arc observed. As the pressure is increased, the spark arc will become more intense and it will be easier to determine the color of the spark arc. The test pressure is to be incrementally increased until the spark arc becomes intermittent, or ceases to occur.

If the test plug continues to fire properly for a chamber pressure within the upper section of the green band, the ignition system under test is acceptable. It has been found that if the spark ceases or becomes intermittent in the red band, the engine will be hard starting. If the spark ceases or becomes intermittent in the yellow band, the engine will start (with some possible difficulty) but will not run over half-speed smoothly and/or will not carry substantial load. Generally, if an engine ignition system produces a blue spark in the upper end of the green band of the test instrument on a regular basis, the ignition system can be considered to be in good electrical condition.

In order to test a two-cylinder engine, both spark plugs are removed and the plug wire that is not being tested should be grounded. The ungrounded plug wire is then tested in accordance with the aforedescribed procedure. The tested plug wire is then grounded and the previously grounded plug wire is connected for testing in a similar manner.

In order to operate the test instrument 10 on a multi-cylinder engine as shown in FIG. 1 with a distributor (or magneto), the test procedure varies slightly from that previously described. In a multi-cylinder engine, all the spark plugs are removed and the test instrument is electrically grounded. to the engine block 11 by the ground wire 38. The coil-to-distributor wire 16 is disconnected from the distributor and connected to the upper terminal 76 of the test instrument 10. (In magneto engines, the wire or terminal from the magneto high-voltage coil is coupled to the test instrument by a high-voltage test lead attachment.) With zero pressure in the spark chamber 20, the engine is cranked using its starter and the spark arc is observed for color, intensity, and firing frequency as previously noted. As in the previously described tests, the pressure is incrementally increased in accordance with the colored bands 48, 50, 52. If the ignition system under test has resistance ignition wire (as with automobiles manufactured since 1954), the spark arc will be somewhat subdued when compared with a metal conductor spark plug wire. However, the spark arc should be frequent (not irregular) and should intensify as the air pressure is increased showing the color of the spark arc to a better extent. Again, the ignition system is acceptable if the spark arc is uniform with the pressure in the middle or upper end of the green band (i.e. at 25 to 30 p.s.i.).

Once this section of the ignition system has been tested, it is advantageous to test the distributing capabilities of the system. To do so, the coil-to-distributor wire 16 is reconnected to the distributor cap socket and all spark plug wires are grounded except the one to be tested. The engine is cranked over and the testing procedure is repeated as previously described. This testing procedure should then be repeated for all of the spark plug wires.

Thus it can be seen that a portable self-contained ignition system test instrument is provided which is easy to use without the need for specialized or auxiliary equipment and which is particularly economical to manufacture.

As will be apparent to persons skilled in the art, various modifications and adaptations of the structure above-described will become readily apparent without departing from the spirit and scope of the invention, the scope of which is defined in the appended claims.

I claim:

1. A portable self-contained ignition test instrument comprising, a housing having an interior spark chamber, a transparent portion permitting visual observation of the spark chamber, an outer portion for forming an exterior air pump chamber, and an air passageway connecting said outer portion and said spark chamber, a reciprocal air pump means movably mounted about said outer portion of said housing in sealing engagement therewith, said pump means and said outer portion of said housing forming an air pump chamber therebetween and coacting to pump compressed air through said air passageway to pressurize said spark chamber upon reciprocation of said pump means, said pump means comprising a sleeve slidably mounted about said outer potion of said housing for movement between a first extended position and a second compression position with the clearance between said sleeve and said outer portion forming said air pump chamber with the displacement of said pump chamber being reduced as said sleeve moves from said first position to said second position, and seal means for sealing said air pump chamber, said seal means sealingly interconnecting said sleeve and said outer portion of said housing, check valve means operationally connected to said air passageway for maintaining air pressure within said spark chamber, a spark plug means having a pair of electrodes forming a spark gap of predetermined size and being mounted to said housing in sealing engagement so that said spark gap is positioned within said spark chamber and visible through said transparent portion, ground wire means for detachably grounding said spark plug means to an engine ground point, and pressure gauge means operationally connected to said spark chamber for indicating pressure within said spark chamber.

2. The device of claim 1 wherein said outer portion of said housing and said sleeve are generally cylindrically shaped and said seal means comprises a first annular seal mounted within a groove in said outer portion of said housing and sealingly engaging said sleeve and a second annular seal mounted within a groove in said sleeve and sealingly engaging said outer portion, said first and second annular seals being disposed on opposite sides of said air passageway.

3. The device of claim 1 which comprises a second air passageway interconnecting said pump chamber to atmosphere when said sleeve is in said first position and being disconnected from said pump chamber when said sleeve is in said second position.

4. The device of claim 3 wherein, said housing has a bore opening into said spark chamber, said spark plug means comprises a spark plug threadably mounted within said bore and having a spark plug seal means for sealingly engaging said housing to seal said spark chamber when said spark plug is mounted within said bore, and said second air passageway comprises a port through said housing connecting said bore to said pump chamber when said sleeve is in said first position, said port being disposed outward of said spark plug seal means when said spark plug is mounted within said bore and being connected to atmosphere by the dimensional clearance between said spark plug and said housing.

5. The device of claim 1 wherein said sleeve has a transparent portion for registration with said transparent portion of said housing for permitting visual observation of said spark chamber.

6. The device of claim 5 wherein said sleeve and said housing are comprised of transparent plastic material.

7. The device of claim 1 wherein said housing has first and second opposing ends with said spark plug means mounted at said first end and forming an abutment stop to engage said sleeve at said first position and with said pressure gauge means mounted at said second end and forming an abutment stop to engage said sleeve at said second position.

8. A portable self-contained ignition system test instrument comprising, a housing having a wall forming an interior spark chamber, a transparent portion permitting visual observation of the spark chamber, an outer portion for forming an exterior air pump chamber, and an air passageway connecting said outer portion and said spark chamber, said wall adjacent said air passageway being cylindrically shaped, a reciprocal air pump means movably mounted about said outer portion of said housing in sealing engagement therewith, said pump means and said outer portion of said housing forming an air pump chamber therebetween and coacting to pump compressed air through said air passageway to pressurize said spark chamber upon reciprocation of said pump means, check valve means operationally connected to said air passageway for maintaining air pressure within said spark chamber, said check valve means comprising a cylindrical seal of flexible material dimensioned and configured for displacement from said air passageway upon pumping of pressurized air through said passageway and for otherwise sealing engagement with said wall to seal off said air passageway from said spark chamber, a spark plug means having a pair of electrodes forming a spark gap of predetermined size and being mounted to said housing in sealing engagement so that said spark gap is positioned within said spark chamber and visible through said transparent portion, ground wire means for detachably grounding said spark plug means to an engine ground point, and pressure gauge means operationally connected to said spark chamber for indicating pressure within said spark chamber.

9. The device of claim 8 wherein said cylindrical seal has a predetermined radial thickness dimensioned to partially displace extraneous volume of said spark chamber.

10. The device of claim 8 wherein said housing has a first end having a first bore opening into said spark chamber with said spark plug means mounted within said first bore and an opposing second end having a second bore opening into said spark chamber with said pressure gauge means mounted within said second bore, said cylindrical seal extending axially between said pressure gauge means and said spark plug means in abutting positioning engagement with said pressure gauge.

* * * * *